UNITED STATES PATENT OFFICE.

WILLIAM H. GILMORE, OF SHILOH, OHIO.

IMPROVEMENT IN PROCESSES OF MANUFACTURING CIDER.

Specification forming part of Letters Patent No. 163,182, dated May 11, 1875; application filed February 13, 1875.

*To all whom it may concern:*

Be it known that I, WILLIAM H. GILMORE, of Shiloh, in the county of Richland and State of Ohio, have invented a new and Improved Process of Manufacturing Cider; and I do hereby declare that the following is a full, clear, and exact description of the same.

The invention consists in the manufacture of cider or effervescent drinks without malt, the juice of dried apples, or apple-butter, boiled cider, cider-sirup, or brewer's yeast. These are found, in practice, to be subject to failure in certain contingencies during the process of manufacture, and afterward to uncontrollable fermentation, and consequent acidification on exposure to heat.

My object has been and is to make the process of manufacture more certain and reliable, rendering the fermentative tendency controllable, and at the same time producing a beverage of superior flavor. In order to do this I make a solution of refined sugar, fifteen pounds avoirdupois, and tartaric acid, one-half pound avoirdupois, in five gallons of warm water, preferably soft, filtered, or pure. I then add of soft filtered cold water fifteen gallons, and of apple-essence one and a half gallon. The proportions thus given are not absolute, but believed to be the best for the purpose, while they may, of course, be varied, so as to make a beverage different in degree, but not in principle, from the one described.

I obtain my apple-essence by freezing cider in open-ended vats, the water being thus eliminated in the form of ice, while the essence is left in the center of vat. I then make a hole through the ice with a heated metallic rod, or in any other way, so as to allow the essence to be drawn out into a keg, barrel, or other receptacle. Thus obtained, the essence is remarkably pure and of the most delicious flavor, one gallon only being obtained from five of the cider. This takes the place of the dried-apple juice, yeast, and boiled cider, which have been hitherto added to the saccharine matter of sugar or acidulated water, in order to give the apple flavor and generate carbonic acid.

I thus lessen the accidents of manufacture, placing the fermentative tendency within reasonable control, and making a beverage more lasting and permanent in its characteristic qualities.

I am aware of the fact that cider has been concentrated by boiling for the easy transportation and preservation of the same, and the concentrated cider afterward diluted and served as a beverage; but in boiling cider the more volatile alcoholic and ethereal elements which hold in solution the essential oils that constitute the delicate flavors are driven off with the first application of heat, and the saccharine and gelatinous portions only of the cider are condensed and preserved, while, by my process, the reverse of the operation is employed—that is to say, the watery and gelatinous portions are eliminated by freezing, and the alcoholic elements, which will not freeze, are drawn off with all of the flavoring-oils in solution, and utilized, in combination with the tartaric acid and sugar, to form the cider compound.

In cider concentrated by boiling it is not necessary that there should have been any fermentation to form alcohol, as, in the event of its presence, it would be driven off and wasted, while in my case it is indispensable to the elimination of the flavoring essences.

Having thus described my invention, what I claim as new is—

A cider compound made of refined sugar, tartaric acid, apple-essence, and water, substantially as described.

WILLIAM H. GILMORE.

Witnesses:
J. Q. A. CLOWES, M. D.,
JOSEPH C. FENNER.